United States Patent
Kant et al.

(10) Patent No.: US 6,469,872 B1
(45) Date of Patent: Oct. 22, 2002

(54) FEATHERWEIGHT ACTUATOR FOR DISC DRIVES

(75) Inventors: Rishi Kant, Boulder, CO (US); Steven R. Speckmann, Louisville, CO (US); Mark A. Schwandt, Platteville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 103 days.

(21) Appl. No.: 09/602,135

(22) Filed: Jun. 23, 2000

Related U.S. Application Data

(60) Provisional application No. 60/140,869, filed on Jun. 24, 1999.

(51) Int. Cl.[7] .................................................. G11B 5/55
(52) U.S. Cl. ................................... 360/265.7; 360/265.9
(58) Field of Search ........................... 360/265.7, 265.9

(56) References Cited

U.S. PATENT DOCUMENTS

| | | | |
|---|---|---|---|
| 5,260,847 A | 11/1993 | Basehore et al. | 360/106 |
| H1573 H | 8/1996 | Budde | 360/104 |
| 5,621,590 A * | 4/1997 | Pace et al. | 360/244.6 |
| 5,627,701 A | 5/1997 | Misso et al. | 360/106 |
| 5,631,787 A * | 5/1997 | Huang et al. | 360/97.02 |
| 5,654,849 A | 8/1997 | Hassibi et al. | 360/98.07 |
| 5,656,877 A | 8/1997 | Loubier | 310/13 |
| 5,677,815 A | 10/1997 | Chan | 360/106 |
| 5,729,406 A | 3/1998 | Faris | 360/106 |
| 5,801,905 A | 9/1998 | Schirle et al. | 360/104 |
| 5,835,311 A | 11/1998 | Brooks, Jr. et al. | 360/106 |
| 5,956,211 A | 9/1999 | Adley | 360/104 |
| 6,061,206 A * | 5/2000 | Foisy et al. | 360/265.7 |
| 6,151,198 A * | 11/2000 | Prater et al. | 360/265.7 |

* cited by examiner

*Primary Examiner*—Jefferson Evans
(74) *Attorney, Agent, or Firm*—Shin Yuan Tan

(57) ABSTRACT

A lightweight actuator for use in a disc drive where the actuator body, yoke and actuator arms are molded as a unitary article. The actuator is preferably molded from a composite material chosen on the basis that its dynamic characteristics are comparable to the characteristics exhibited by materials conventionally used for making actuators. In addition, the actuator facilitates the formation of zero insertion force connection features at the actuator arms for coupling with the respective suspensions. The present invention thus allows for the application of improved connection methods at lower cost.

8 Claims, 5 Drawing Sheets

FEATHERWEIGHT ACTUATOR FOR DISC DRIVES

This patent application claims priority from U.S. Provisional Application No. 60/140,869, filed Jun. 24,1999.

FIELD OF THE INVENTION

The present invention relates generally to disc drives. More particularly, the present invention relates to an improved actuator.

BACKGROUND OF THE INVENTION

The actuator is in important sub-assembly in a disc drive, and any improvement in its performance leads directly to improvement in the performance of the disc drive. Actuators are moving parts that are designed to seek data at various locations on the discs by performing random seek motions at high velocities. Actuator parts are therefore subject to high frequency stimulation, causing them to vibrate and take time to settle over a track.

Ideally, actuators should have high stiffness so that the "settle" time is shorter. At the same time, a low inertia is desired so that the actuator can be moved quickly from one location to another with minimum power consumption.

To achieve the desired mechanical properties, the production of actuators has invariably involved many steps. For example, the U.S. Pat. No. 5,835,311, issued on Nov. 10, 1998 to Brooks, Jr. et al., for "Shock-Resistant Data Storage System Actuator Assembly" proposes an actuator arm that is fabricated from a metal. In order to achieve the desired stiffness which is critical to proper actuator performance, the actuator arm is further plated with another metal. Similarly, in the U.S. Pat. No. 5,627,701 issued on May 6, 1997, to Misso et al., for "Skinned Foam Core E-Block", the actuator is formed from a foam core material and subsequently coated with a non-porous stressed skin to provide the necessary mechanical properties.

In trying to reduce inertia, there have been attempts to use polymers to form the actuator. However, it is commonly recognized that non-metallic actuator arms poses additional assembly difficulties particularly to the swaging process which is the conventional method used for attaching the actuator arm to the suspension or the head gimbal assembly. Thus, although the U.S. Pat. No. 5,656,877 for "Swing-Type Actuator and Method of Making Same", issued to Loubier on Aug. 12, 1997, proposes a thermoplastic for forming the housing of the actuator, it also proposes a metallic actuator arm. Similarly, the U.S. Pat. No. 5,654,849 issued to Hassibi et al. on Aug. 5, 1997, entitled "Molded Swing-Type Actuator Assembly with Press-Fit Pivot and Spring-Loaded Ground Conductor Elements". Assembly processes have to be incorporated into the production line for such cases, and even more so for those designs which have the various components separately molded and then built up to form the actuator. Examples of such built-up actuators are described in the U.S. Pat. No. 5,956,211 entitled "Chip attached to Actuator Arm having Heat Conducting Fibers" issued Sep. 21, 1999, to Adley and in the U.S. Pat. No. 5,677,815 entitled "Support Arm for Use in an Actuator Assembly of a Digital Storage System with the Support Arm being Formed from a Polymer and including a Grounding Conductor" issued Oct. 14, 1997, to Chan.

Because of the continuous pressure to reduce cost and simplify manufacturing processes, there is a need for an improved actuator which can be manufactured at lower cost and yet provide comparable or improved performance. The present invention provides a solution to the problems described above, as well as others, and offers other advantages over the prior art.

SUMMARY OF THE INVENTION

The present invention relates a lightweight actuator for use in a disc drive where the actuator body, yoke and actuator arms are molded as a single unit or as a unitary article. The actuator is molded from a polymer which is preferably a composite material chosen on the basis that its dynamic characteristics are comparable to the characteristics exhibited by conventional material. For example, the composite material may be chosen on the basis that the wave velocity in the composite material is roughly of the same order as that in aluminum. The resultant actuator is lighter and yet possesses equivalent or superior dynamic properties, as compared to conventional actuators. The present invention therefore provides for an improved actuator which can be produced through fewer manufacturing processes.

According to one embodiment of the invention, the actuator is molded with features at the actuator arms for coupling with one or more suspensions. Preferably, the features are configured for zero insertion force connection with the suspension. Thus, the present invention also allows for the application of improved connection methods at lower cost.

These and various other features as well as advantages which characterize the present invention will be apparent upon reading of the following detailed description and review of the associated drawings.

DETAILED DESCRIPTION

Preferred embodiments of the present invention are described below with reference to the drawings.

Figure 1:
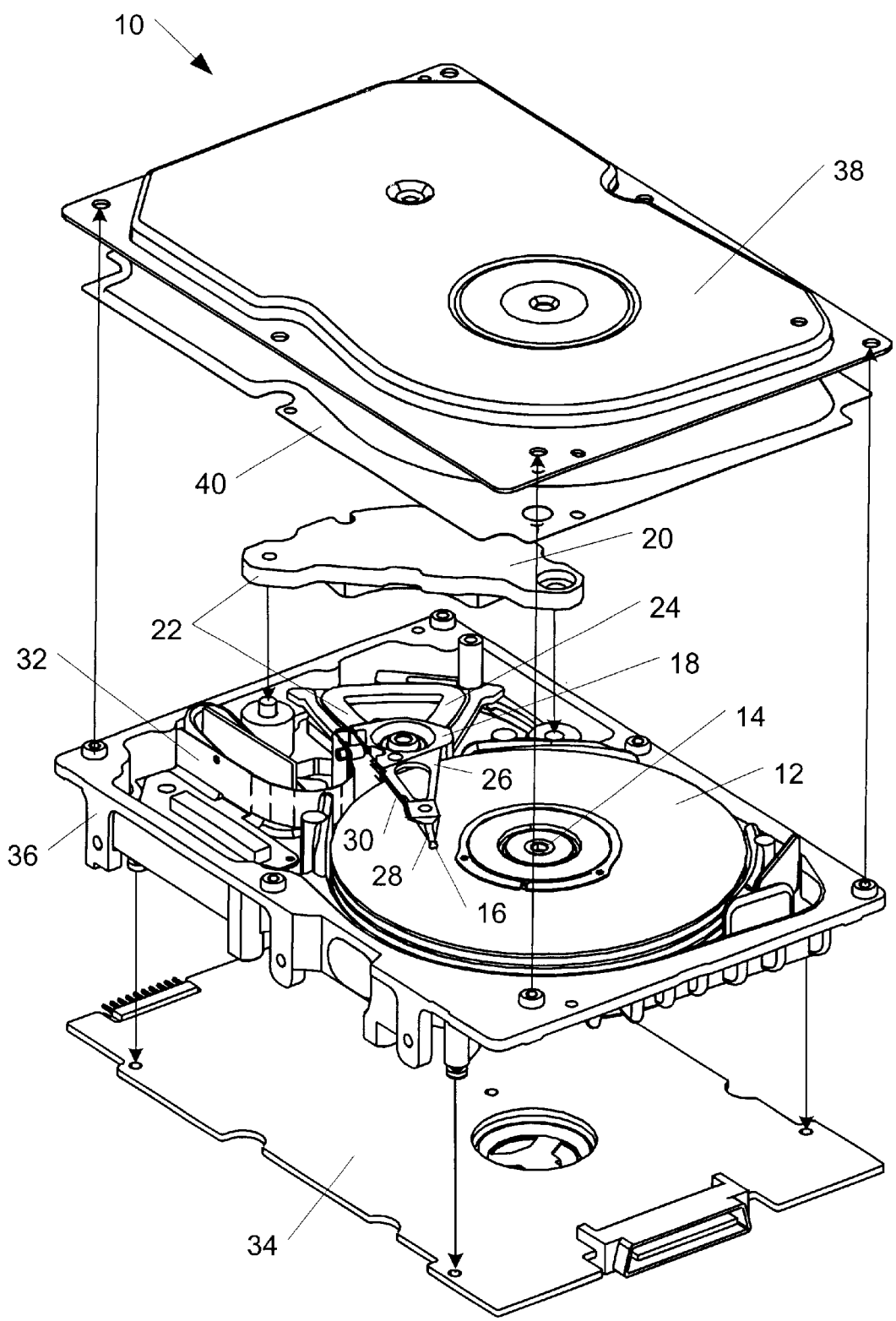
FIG. 1 is a perspective view of a disc drive.

FIG. 1 shows a disc drive 10 with one or more discs 12 mounted to a spindle motor 14 for rotation. Data is written to or read from the discs by read/write heads 16. An actuator 18 is operably connected to the read/write heads to position the read/write heads in the desired position. In FIG. 1, the top plate 20 of a voice coil motor 22 is removed to show a voice coil 24 attached to the actuator. The actuator also extends into one or more actuator arms 26. At least one suspension 28 is joined to each actuator arm, and each suspension supports a read/write head over a corresponding disc surface. Circuitry 30 is provided to carry signals to or from the read/write heads, via a flex circuit 32, to a controller board 34 sometimes found attached below the base 36 of the disc drive. A cover 38 with a gasket 40 is used to form a sealed enclosure with the base, within which the disc drive components are mounted.

Figure 2:
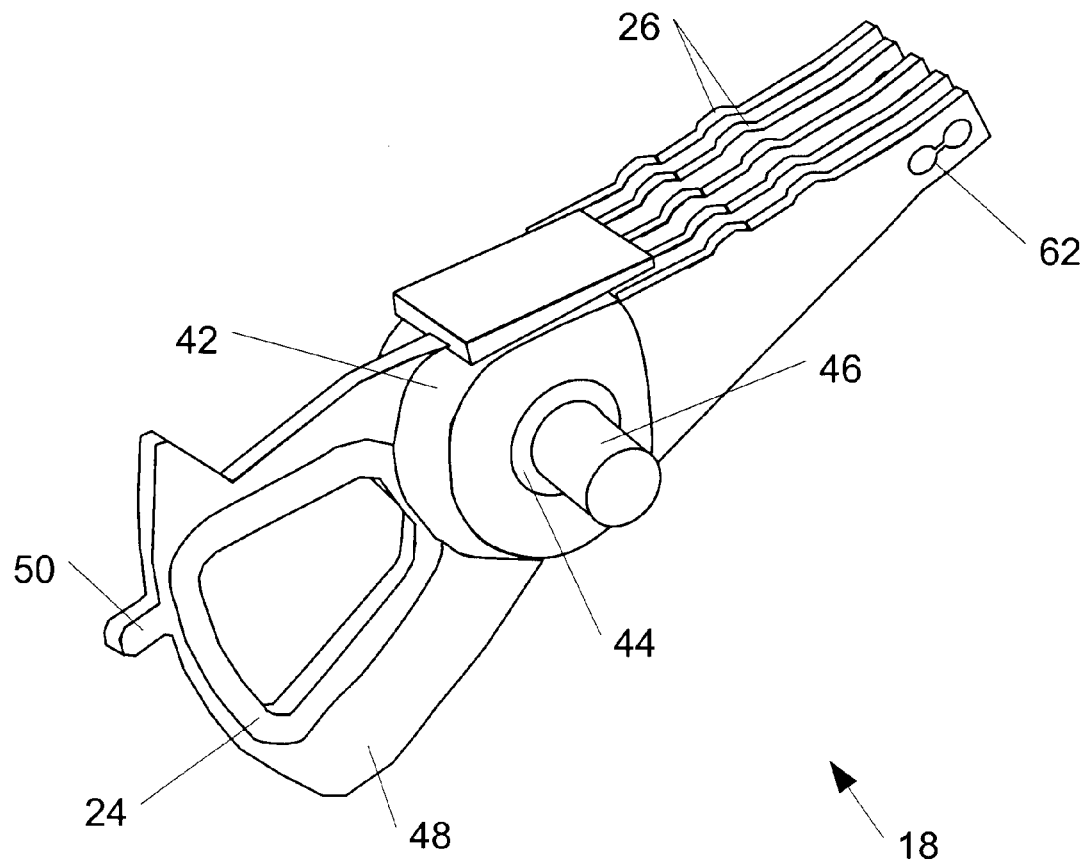
FIG. 2 shows an actuator according to a preferred embodiment of the present invention.

According to the present invention, an actuator is formed as an integral overmold, and therefore does not require as many fasteners and connectors as a conventional actuator assembly. Making reference to FIG. 2, an actuator 28 of a most preferred embodiment of the present invention includes a housing 42 for operable attachment to a pivot bearing cartridge 44 such that the actuator can rotate about the pivot bearing shaft 46. A yoke 48 is integrally formed with the housing to provide support for the voice coil 24. The housing is also integrally formed with an array of actuator arms 26 to which suspensions can be joined.

In a further embodiment, the actuator is molded with the various limit stops 50 or other features as required by the specific design of the disc drive.

In another aspect of the invention, the actuator is formed from a composite material, and the selection of the composite material is such that the proposed actuator has comparable or improved performance characteristics over a conventional actuator.

The composite material chosen is one which has a normal wave velocity comparable to that of a conventional material, of which aluminum and magnesium are a few examples. The normal wave velocity is defined by the formula $\sqrt{(E/\rho)}$ where E is the Young's Modulus and $\rho$ is the density of the material. It is found that, for a given design of the actuator, the wave velocity characterize the dynamic properties of the actuator. The composite material is therefore selected on the basis of its dynamic performance characteristics. This is further illustrated by the following Table 1 which compares the material properties of aluminum with a proposed composite material:

TABLE 1

| Property | Aluminum | Composite Material |
|---|---|---|
| E ($N \cdot m^{-2}$) | $6.89 \times 10^{10}$ | $8.96 \times 10^9$ |
| $\rho$ ($g \cdot cm^{-3}$) | 3.0 | 1.0 |
| $\sqrt{(E/\rho)}$ ($m \cdot s^{-1}$) | 0.25 | 0.15 |
| $\eta$ | 0.1% | 10–15% |
| scattering | none | high |

The composite material of a comparable wave velocity which has a lower density and higher stiffness than aluminum also has better damping qualities. The preferred composite material is characterized by high scattering so as to favor the dispersion of waves in the high frequency region experienced by the actuator during disc drive operations.

The actuator formed from the composite material is about 26% lighter than the conventional aluminum actuator and therefore requires fewer turns of the voice coil to provide the necessary energy to rotate the actuator about the pivot bearing shaft.

Figure 3:
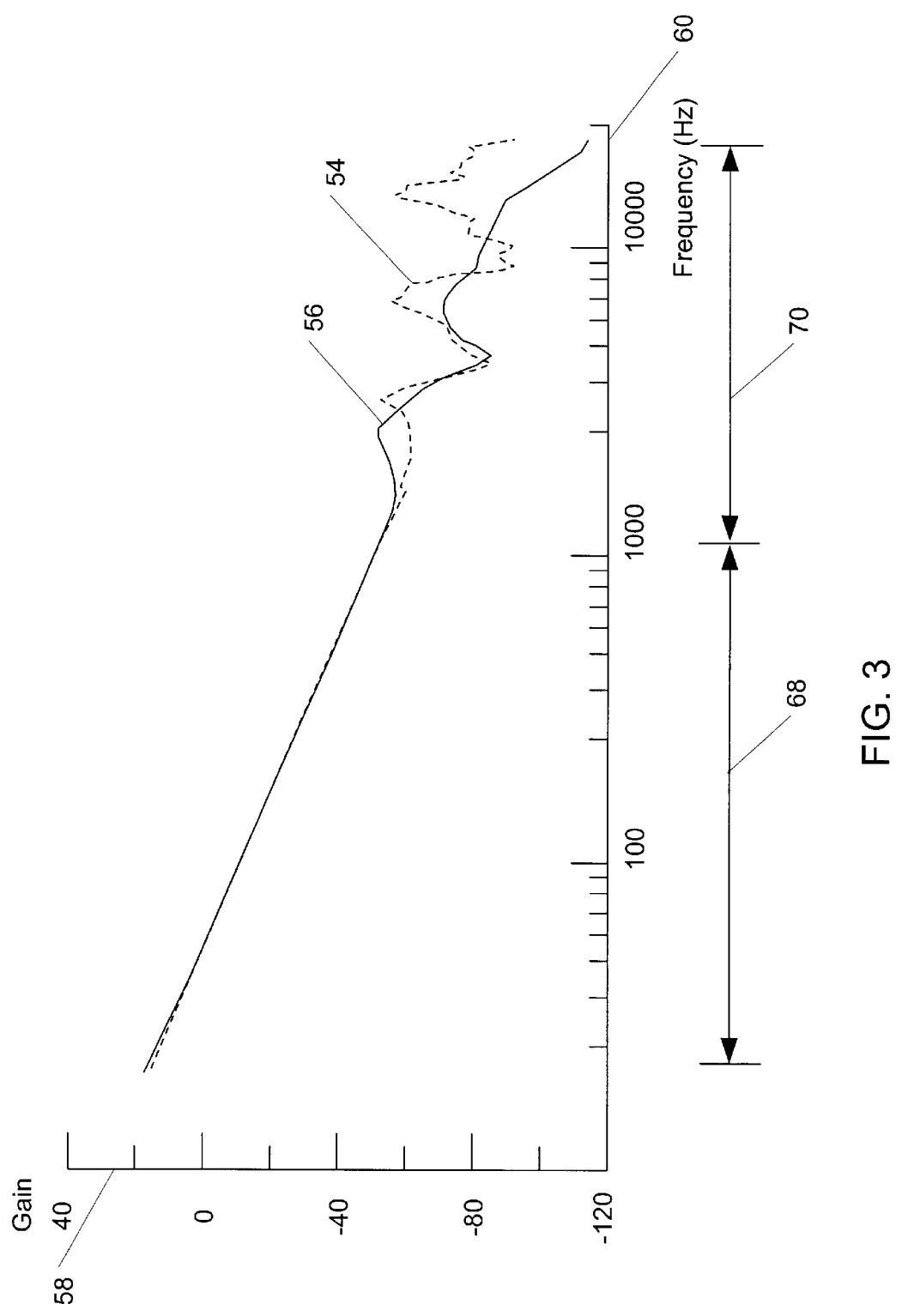
FIG. 3 compares the Bode plots for an actuator of the present invention with that of a conventional actuator.

The characteristics of an actuator of the present invention can be further studied with the aid of a Bode plot, as shown in FIG. 3. The dashed line 54 shows the Bode plot of a conventional actuator, and the solid line 56 shows the transfer function 58 with respect to the excitation frequency 60 of the in-situ stimulus experienced by an actuator of the present invention. The stimulus in this case is the current in the voice coil. The torque created in the actuator is linearly proportional to the current in the voice coil, therefore, to display the dynamic response characteristics of the actuators, the following transfer function is used:

$$20 \log_{10} \frac{\text{(cross track motion of the read/write head)}}{\text{torque}}$$

Within the operational frequency range 68, the gain margins of both actuators are similar, regardless of the crossover frequency chosen. As such, the composite of the present invention provides a feasible alternative to the conventional actuator. Furthermore, in the higher frequency region 70, the composite actuator performs better than the conventional actuator.

There are several composite materials that possess the desired $\sqrt{(E/\rho)}$ ratio, and can be used to form actuators of the present invention. Preferably, a two-phase composite material is used. The composite may have glass, metal or carbon as fillers. A different material is usually found distributed throughout the filler to give the desired overall material properties of the composite material. Preferably a glass-matrix composite is used to form the actuator. One example of such materials is the resin LEXAN® available from GE Plastics.

According to one preferred embodiment of the present invention, the actuator is cast as a single article with each actuator arm 26 having features 62 for coupling with at least one suspension. Preferably the features are formed in the same molding process that forms the actuator article.

Figure 4:
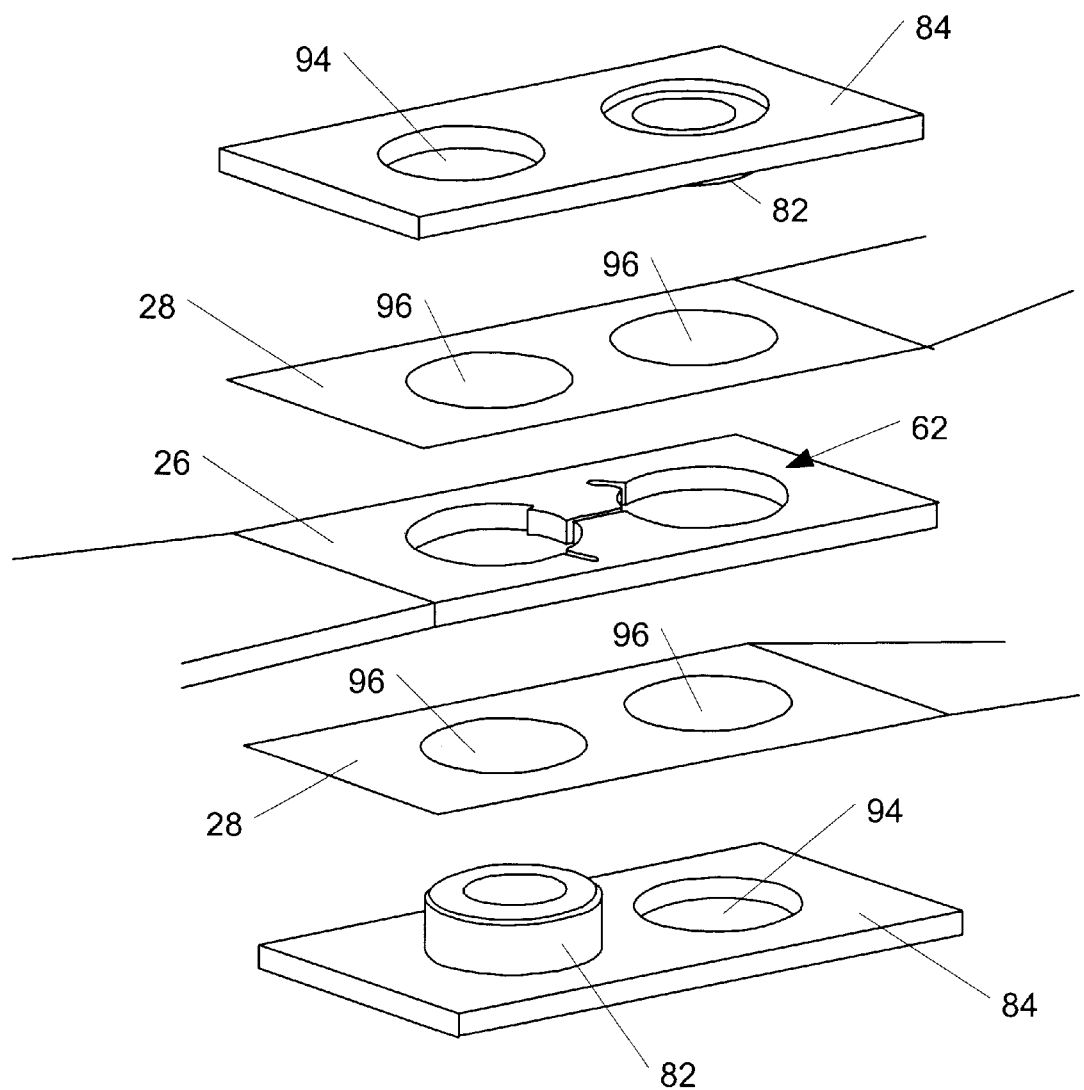
FIG. 4 illustrates a preferred method of connecting an actuator arm with at least one suspension.
Figure 5:
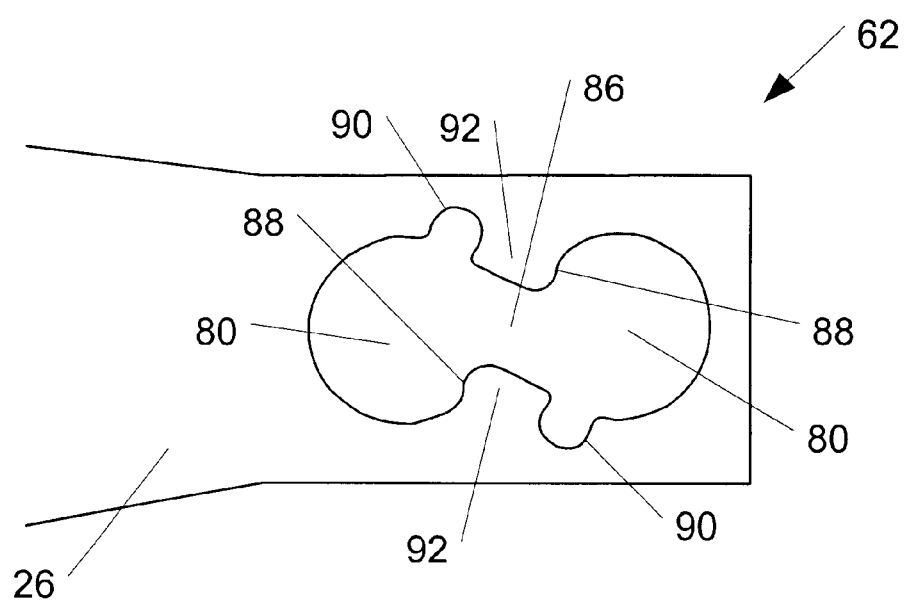
FIG. 5 shows a preferred embodiment of the present invention where features for coupling with suspensions are formed as part of the actuator arm.

In one embodiment, the features are configured for zero insertion force connection with at least one corresponding suspension. Referring to FIG. 4 and FIG. 5, the actuator arm 26 may be formed with a pair of longitudinally spaced holes 80, dimensioned and spaced to interact with the bosses 82 of a pair of mounting plates 84. The holes 80 are connected by a connecting slot 86. The holes 80 in the actuator arm 26 preferably include contact surfaces 88, composed of portions of the inner diameters of the holes 80 having smaller diameters than the remainder of the holes 80.

The dimensions of the holes 80 between the contact surfaces and the opposite sides of the holes 80 are selected to form an interference fit between the holes 80 and the bosses 82 of mounting plates 84. Each mounting plate 84 may be welded to a suspension 28, or a suspension 28 may be sandwiched between a mounting plate 84 and the actuator arm 26, so that the actuator arm 26 is joined to at least one suspension 28. The height of the boss 82 is configured to pass through the thickness of the actuator arm 26 and into a mounting plate hole 94 of a second mounting plate 84 on the opposite side of the actuator arm 26. The boss 82 of one mounting plate 84 is made to form an interference fit with the mounting plate hole 94 of the other mounting plate. The suspensions are therefore provided with the corresponding holes 96.

Associated with each of the holes 80 on the actuator arm 26 is a radially extending slot or notch 90 which combines with the connecting slot 86 to form two tabs 92. When the boss 82 of a mounting plate 84 is inserted through a hole 80 in the actuator arm 26, contact between the boss 82 and the contact surface 88 will cause the tabs 92 to be bent. This reduces the inner diameter of the opposite hole 80 and increases contact against the boss 82 inserted in the opposite hole 80. The bending of the tabs 92 also act as to close the slots or notches 90, which is the type of deformation which induces the least amount of localized material stress. The dimensions and locations of the various features 62 described in the foregoing are selected such that the bending of the tabs 92 does not result in plastic deformation of the material of the actuator arm 26. If it becomes necessary to remove and replace the suspension 28, the mounting system will suffer no reduction in effectiveness. Thus, it can be seen that the present invention improves on the prior art by providing an actuator which may be produced with features for coupling already incorporated as part of the actuator arms, without the need for additional fabrication steps. And more advantageously, the present invention facilitates the incorporation of coupling features such as those described in the foregoing which offer significant improvements over conventional connection methods.

Alternatively, embodiments of the present invention may be described as follows:

An actuator 18 is a unitary article formed by a molding process. The unitary article includes a yoke 48 and at least one actuator arm 26 extending from the housing 42. The actuator 18 may be molded from a polymer which has dynamic characteristics of about the same order as aluminum. One of the dynamic characteristics is the characteristic of a normal wave velocity, which is defined as $\sqrt{(E/\rho)}$ where E is the Young's Modulus and p is the density of the polymer. Preferably, the polymer is a composite of a filler of a first material and an additive of a second material, where the additive is dispersed in the filler. The polymer may be one of a LEXAN® polymer.

The actuator arm 26 may have features 62 which are formed in the molding process such that they are configured for coupling with at least one suspension 28. Preferably, the features 62 are configured for zero insertion force connection with the suspension 28.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the composite material chosen and the shape and configuration of the actuator may vary depending on the performance characteristics required by the particular disc drive design. The shape and configuration of the connection features on the actuator article may also be varied while maintaining substantially the same functionality without departing from the scope and spirit of the present invention. Although the actuator article is formed as a single unit in a molding process, the present invention does not preclude the use of machining techniques to improve the tolerance or finish the product.

What is claimed is:

1. An actuator for moving at least one suspension, the actuator comprising:
   a unitary article which comprises:
      a housing;
      a yoke extending from the housing; and
      at least one actuator arm extending from the housing, wherein the unitary article is formed by a molding process and wherein the unitary article is molded from a polymer, the polymer having dynamic characteristics that are of about the same order as aluminum, the at least one actuator arm having features molded for zero insertion force connection with the suspension.

2. An actuator of claim 1 wherein one of the dynamic characteristics is the characteristic of a normal wave velocity, the normal wave velocity being defined as $\sqrt{(E/\rho)}$ where E is the Young's Modulus and $\rho$ is the density of the polymer.

3. An actuator of claim 1 wherein the polymer is a composite comprising:
   a filler of a first material; and
   an additive of a second material, the additive being dispersed in the filler.

4. An actuator of claim 3 wherein the polymer is one of a LEXAN® polymer.

5. A disc drive with at least one suspension for supporting at least one read/write head to a disc surface, the disc drive comprising:
   an actuator for moving the at least one suspension, the actuator comprising:
      a unitary article comprising:
         a housing;
         a yoke extending from the housing; and
         at least one actuator arm extending from the housing, wherein the at least one actuator arm is configured for operable connection with the at least one suspension, wherein the unitary article is formed by a molding process and wherein the unitary article is molded from a polymer, the polymer having dynamic characteristics that are of about the same order as aluminum, the at least one actuator arm having features molded for zero insertion force connection with the suspension.

6. A disc drive of claim 5 wherein one of the dynamic characteristics is the characteristic of a normal wave velocity, the normal wave velocity being defined as $\sqrt{(E/\rho)}$ where E is the Young's Modulus and $\rho$ is the density of the polymer.

7. A disc drive of claim 5 wherein the polymer is a composite comprising:
   a filler of a first material; and
   an additive of a second material, the additive being dispersed in the filler.

8. A disc drive of claim 7 wherein the polymer is one of a LEXAN® polymer.

* * * * *